US009573522B2

(12) United States Patent
James

(10) Patent No.: US 9,573,522 B2
(45) Date of Patent: Feb. 21, 2017

(54) VEHICLE SEAT HAPTIC INDICATION OF FUTURE PLANNED DRIVING MANEUVERS

(71) Applicant: Toyota Motor Engineering & Manufacturing North America, Inc., Erlanger, KY (US)

(72) Inventor: Michael R. James, Northville, MI (US)

(73) Assignee: Toyota Motor Engineering & Manufacturing North America, Inc., Erlanger, KY (US)

(*) Notice: Subject to any disclaimer, the term of this patent is extended or adjusted under 35 U.S.C. 154(b) by 0 days.

(21) Appl. No.: 14/699,670

(22) Filed: Apr. 29, 2015

(65) Prior Publication Data

US 2016/0318442 A1    Nov. 3, 2016

(51) Int. Cl.
*B60Q 9/00* (2006.01)
*B60N 2/44* (2006.01)
*B60N 2/04* (2006.01)

(52) U.S. Cl.
CPC .................. *B60Q 9/00* (2013.01); *B60N 2/04* (2013.01); *B60N 2/44* (2013.01)

(58) Field of Classification Search
CPC .............. B60Q 9/00; B60N 2/04; B60N 2/44
See application file for complete search history.

(56) References Cited

U.S. PATENT DOCUMENTS

| 8,655,554 B2 | 2/2014 | Lin |
| 2006/0131093 A1* | 6/2006 | Egami ................... B60N 2/449 180/272 |
| 2009/0164073 A1* | 6/2009 | Mabuchi .............. B60N 2/0232 701/49 |

(Continued)

FOREIGN PATENT DOCUMENTS

GB    2503094 A    12/2013

OTHER PUBLICATIONS

Hong et al.; "Development of a Semi-Autonomous Vehicle Operable by the Visually-Impaired"; IEEE International Conference on Multisensor Fusion and Integration for Intelligent Systems; Aug. 20-22, 2008; pp. 539-544; Seoul, Korea; (6 pages).

(Continued)

*Primary Examiner* — Jerrah Edwards
*Assistant Examiner* — Majdi Alsomiri
(74) *Attorney, Agent, or Firm* — Christopher G. Darrow; Darrow Mustafa PC

(57) ABSTRACT

Arrangements related to the operation of an autonomous vehicle are described. The autonomous vehicle includes a vehicle seat. It can be determined whether a future planned driving maneuver of the autonomous vehicle includes a change in a current motion of the autonomous vehicle. Responsive to determining that the future planned driving maneuver includes a change in the current motion of the autonomous vehicle, the vehicle seat can be caused to provide a haptic indication of the future planned driving maneuver prior to implementing the future planned driving maneuver. In this way, a vehicle seat occupant can be alerted to the future planned driving maneuver. The haptic indication can include a movement of the vehicle seat. In one or more arrangements, the movement of the vehicle seat can correspond to a sensation that a vehicle seat occupant will experience during at least a portion of the future planned driving maneuver.

20 Claims, 3 Drawing Sheets

(56) References Cited

U.S. PATENT DOCUMENTS

| | | | | |
|---|---|---|---|---|
| 2010/0066116 A1* | 3/2010 | Coenen | ............... | B60N 2/4214 296/65.01 |
| 2010/0274438 A1* | 10/2010 | Egami | ................... | B60N 2/449 701/1 |
| 2011/0035116 A1* | 2/2011 | Ieda | ................... | B60R 21/0134 701/45 |
| 2014/0346823 A1 | 11/2014 | Stebbins et al. | | |

OTHER PUBLICATIONS

Brown; "Technological Advancement for Vehicles Operable by the Visually Impaired"; Senior Project for California Polytechnic State University; Jun. 2011; San Luis Obispo, CA; (56 pages).

Hogema et al.; "A Tactile Seat for Direction Coding in Car Driving: Field Evaluation"; IEEE Transactions on Haptics; Oct.-Dec. 2009; pp. 181-188; vol. 2, No. 4; (8 pages).

Corley; "The Danger-Sensing Driver's Seat"; IEEE Spectrum; Jul. 2010; pp. 12-13; (2 pages).

"Motion sickness in autonomous cars: Don't read and ride"; Apr. 9, 2015; [retrieved Apr. 29, 2015]; retrieved from the Internet: <http://www.umtri.umich.edu/what-were-doing/news/motion-sickness-autonomous-cars-dont-read-and-ride> (2 pages).

* cited by examiner

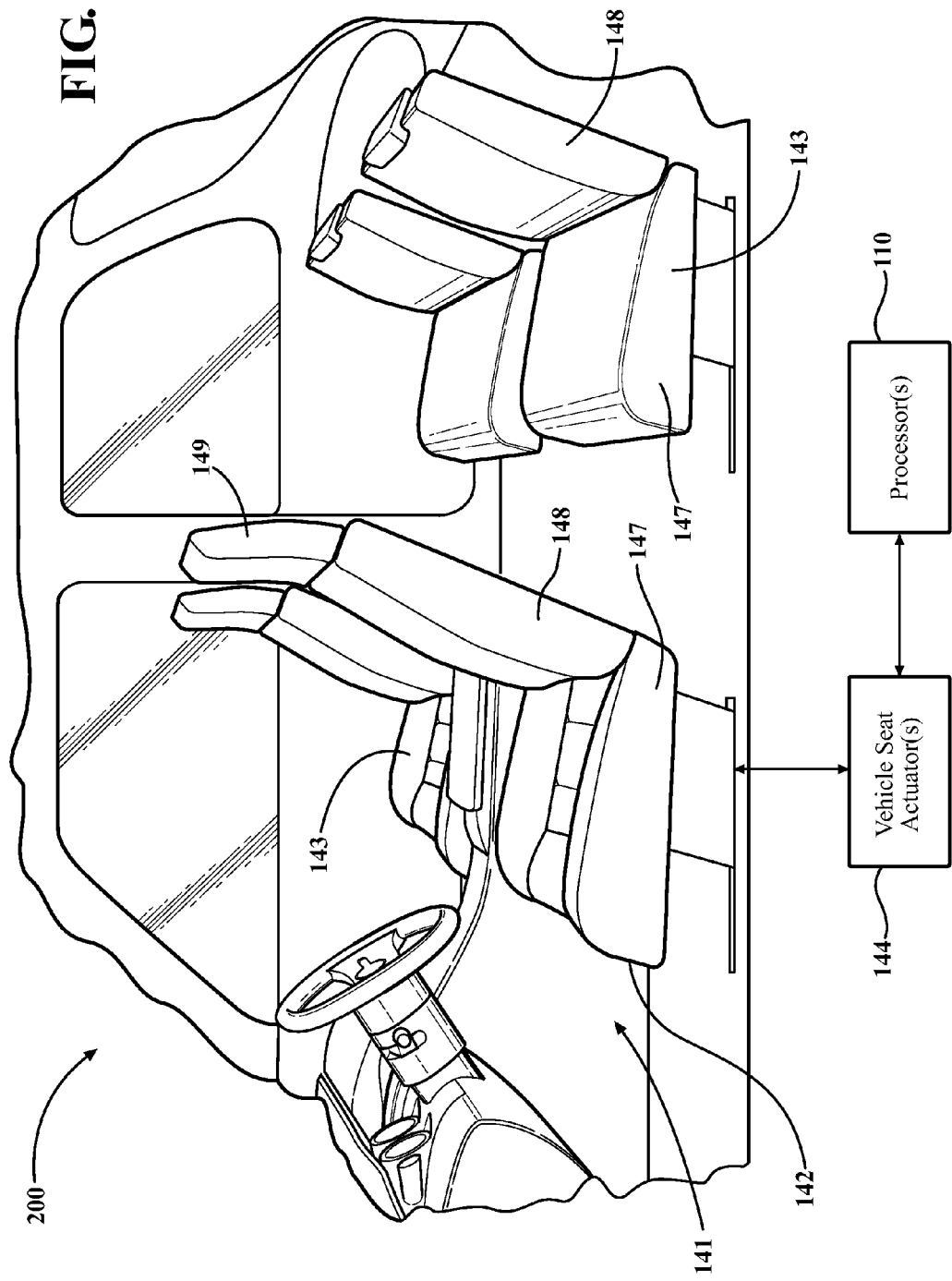

300

```
┌─────────────────────────────────────────┐
│ Determining whether a future planned    │
│ driving maneuver of the autonomous      │──── 310
│ vehicle includes a change in a          │
│ current motion of the autonomous vehicle│
└─────────────────────────────────────────┘
                    │
                    ▼
┌─────────────────────────────────────────┐
│ Responsive to determining that the      │
│ future planned driving maneuver         │
│ includes a change in the current        │
│ motion of the autonomous vehicle,       │──── 320
│ causing the seat to provide a haptic    │
│ indication of the future planned        │
│ driving maneuver prior to implementing  │
│ the future planned driving maneuver     │
└─────────────────────────────────────────┘
```

FIG. 3

VEHICLE SEAT HAPTIC INDICATION OF FUTURE PLANNED DRIVING MANEUVERS

FIELD

The subject matter described herein relates in general to vehicles having an autonomous operational mode and, more particularly, to future planned driving maneuvers of such vehicles.

BACKGROUND

Some vehicles may include an operational mode in which a computing system is used to navigate and/or maneuver the vehicle along a travel route with minimal or no input from a human driver. Such vehicles include sensors that are configured to detect information about the surrounding environment, including the presence of objects in the environment. The computing systems are configured to process the detected information to determine how to navigate and/or maneuver the vehicle through the surrounding environment. Vehicle occupant acceptance and comfort with the autonomous operation of the vehicle is dependent upon trusting that the system is aware of the situation and will respond properly.

SUMMARY

In one respect, the present disclosure is directed to a method of operating an autonomous vehicle. The autonomous vehicle can include a vehicle seat. The method can include determining whether a future planned driving maneuver of the autonomous vehicle includes a change in a current motion of the autonomous vehicle. The method can also include, responsive to determining that the future planned driving maneuver includes a change in the current motion of the autonomous vehicle, causing the vehicle seat to provide a haptic indication of the future planned driving maneuver prior to implementing the future planned driving maneuver. Thus, a vehicle seat occupant can be alerted to the future planned driving maneuver.

In another respect, the present disclosure is directed to a system for an autonomous vehicle. The system includes a vehicle seat. The system also includes a processor operatively connected to the vehicle seat. The processor can be programmed to initiate executable operations. The executable operations can include determining whether a future planned driving maneuver of the autonomous vehicle includes a change in a current motion of the autonomous vehicle. The executable operations can also include, responsive to determining that the future planned driving maneuver includes a change in the current motion of the autonomous vehicle, causing the vehicle seat to provide a haptic indication of the future planned driving maneuver prior to implementing the future planned driving maneuver.

In yet another respect, the present disclosure is directed to a computer program product for operating an autonomous vehicle, which includes a vehicle seat. The computer program product can include a computer readable storage medium having program code embodied therein. The program code can be executable by a processor to perform a method. The method can include determining whether a future planned driving maneuver of the autonomous vehicle includes a change in a current motion of the autonomous vehicle. The method can include, responsive to determining that the future planned driving maneuver includes a change in the current motion of the autonomous vehicle, causing the vehicle seat to provide a haptic indication of the future planned driving maneuver prior to implementing the future planned driving maneuver. Thus, a vehicle seat occupant can be alerted to the future planned driving maneuver.

BRIEF DESCRIPTION OF THE DRAWINGS

FIG. 2 is a partially diagrammatic view of an interior portion of an autonomous vehicle configured to provide haptic alerts to a vehicle occupant of future planned driving maneuvers.

FIG. 3 is a method of operating an autonomous vehicle to alert a vehicle occupant of future planned driving maneuvers.

DETAILED DESCRIPTION

Figure 1:
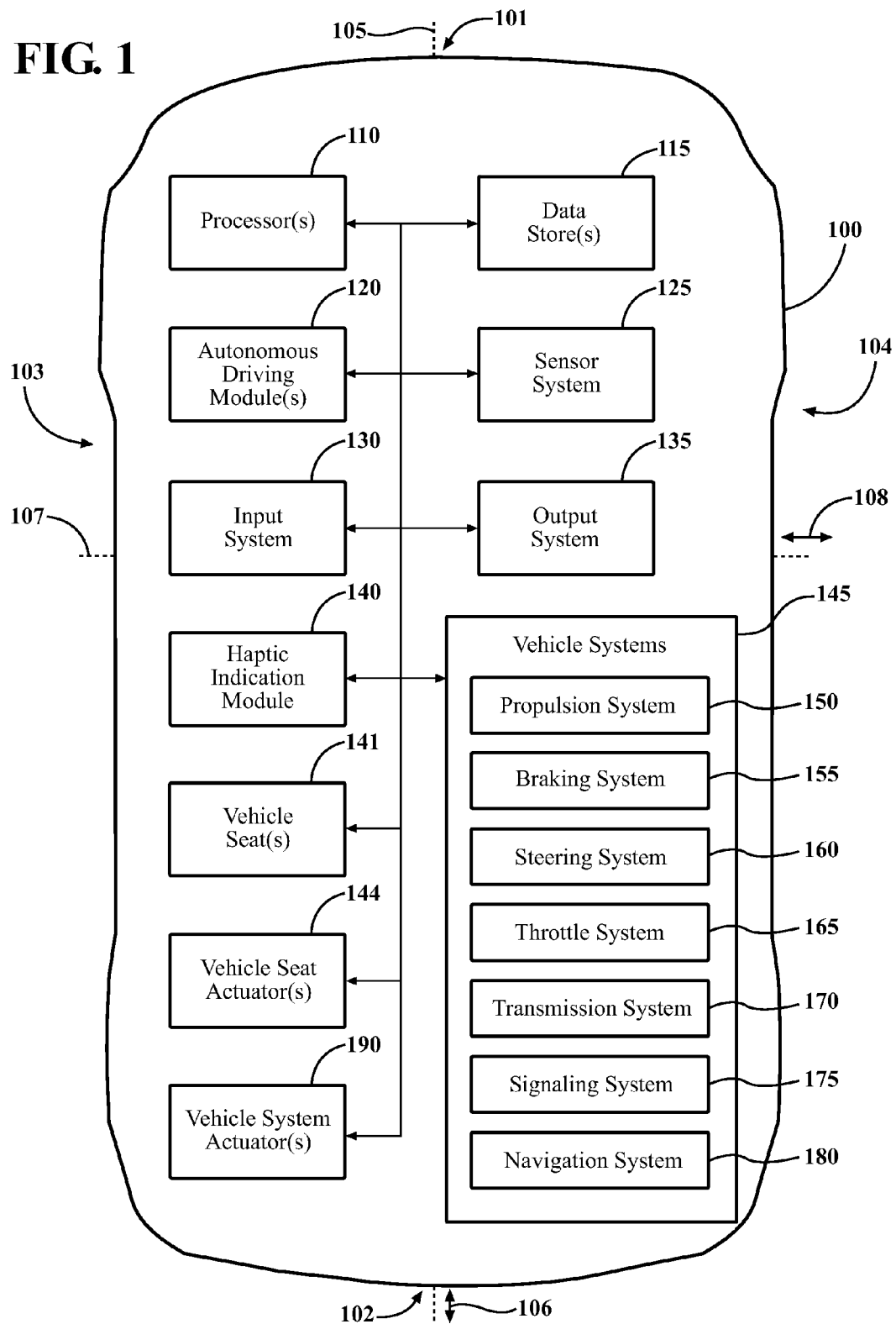
FIG. 1 is an example of an autonomous vehicle.

This detailed description relates to the operation of an autonomous vehicle. More particularly, this detailed description relates to the operation of an autonomous vehicle when a future planned driving maneuver includes a change in the current motion of the autonomous vehicle. In response to determining that the future planned driving maneuver includes a change in the current motion of the vehicle, a vehicle seat in the autonomous vehicle can be used to provide a haptic indication of the future planned driving maneuver. The haptic indication can be provided prior to implementing the future planned driving maneuver. The present detailed description relates to systems, methods and computer program products that incorporate such features. In at least some instances, such systems, methods and computer program products can, among other things, improve occupant confidence in the autonomous operation of the vehicle.

Detailed embodiments are disclosed herein; however, it is to be understood that the disclosed embodiments are intended only as exemplary. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in FIGS. 1-3, but the embodiments are not limited to the illustrated structure or application.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details.

Referring to FIG. 1, an example a vehicle 100 is shown. As used herein, "vehicle" means any form of motorized transport. In one or more implementations, the vehicle 100 can be an automobile. While arrangements will be described herein with respect to automobiles, it will be understood that embodiments are not limited to automobiles. In one or more implementations, the vehicle 100 may be a watercraft, an aircraft or any other form of motorized transport.

The vehicle 100 can have a front end 101 and a back end 102. The vehicle can have a left lateral side 103 and a right lateral side 104. The vehicle 100 can have an associated longitudinal axis 105, which can be the central axis of the vehicle 100. The vehicle 100 can have an associated longitudinal direction 106. "Longitudinal direction" means any direction that is substantially parallel to and/or substantially co-linear with the longitudinal axis 105. As used herein, the term "substantially" includes exactly the term it modifies and slight variations therefrom. Thus, the term "substantially parallel" means exactly parallel and slight variations therefrom (e.g., within normal manufacturing tolerances, within about 10 degrees or less, within about 5 degrees or less, within about 3 degrees or less, etc.). The vehicle 100 can have an associated lateral axis 107. The lateral axis 107 can be substantially perpendicular to the longitudinal axis 105. The vehicle 100 can have an associated lateral direction 108. "Lateral direction" means any direction that is substantially parallel to and/or substantially co-linear with the lateral axis 107.

According to arrangements herein, the vehicle 100 can be an autonomous vehicle. As used herein, "autonomous vehicle" means a vehicle that configured to operate in an autonomous mode. "Autonomous mode" means that one or more computing systems are used to navigate and/or maneuver the vehicle along a travel route with minimal or no input from a human driver. In one or more arrangements, the vehicle 100 can be highly automated.

In some instances, the vehicle 100 can be configured to be selectively switched between an autonomous mode and a manual mode. Such switching can be implemented in any suitable manner, now known or later developed. "Manual mode" means that a majority of the navigation and/or maneuvering of the vehicle along a travel route is performed by a human driver. The manual mode can include vehicles in which some of the vehicle systems, operations and/or functions that are automated. As an example, a vehicle that is operated manually but includes cruise control or adaptive cruise control systems can be considered to be in the manual mode.

The vehicle 100 can include various elements, some of which may be a part of an autonomous driving system. Some of the possible elements of the vehicle 100 are shown in FIG. 1 and will now be described. It will be understood that it is not necessary for the vehicle 100 to have all of the elements shown in FIG. 1 or described herein. The vehicle 100 can have any combination of the various elements shown in FIG. 1. Further, the vehicle 100 can have additional elements to those shown in FIG. 1. In some arrangements, vehicle 100 may not include one or more of the elements shown in FIG. 1. Further, while the various elements are shown as being located within the vehicle 100 in FIG. 1, it will be understood that one or more of these elements can be located external to the vehicle 100. Further, the elements shown may be physically separated by large distances.

The vehicle 100 can include one or more processors 110. "Processor" means any component or group of components that are configured to execute any of the processes described herein or any form of instructions to carry out such processes or cause such processes to be performed. The processor 110 may be implemented with one or more general-purpose and/or one or more special-purpose processors. Examples of suitable processors include microprocessors, microcontrollers, DSP processors, and other circuitry that can execute software. Further examples of suitable processors include, but are not limited to, a central processing unit (CPU), an array processor, a vector processor, a digital signal processor (DSP), a field-programmable gate array (FPGA), a programmable logic array (PLA), an application specific integrated circuit (ASIC), programmable logic circuitry, and a controller. The processor 110 can include at least one hardware circuit (e.g., an integrated circuit) configured to carry out instructions contained in program code. In arrangements in which there is a plurality of processors 110, such processors can work independently from each other or one or more processors can work in combination with each other. In one or more arrangements, the processor 110 can be a main processor of the vehicle 100. For instance, the processor 110 can be an engine control unit (ECU).

The vehicle 100 can include one or more data stores 115 for storing one or more types of data. The data store 115 can include volatile and/or non-volatile memory. Examples of suitable data stores 115 include RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The data store 115 can be a component of the processor 110, or the data store 115 can be operatively connected to the processor 110 for use thereby. The term "operatively connected," as used throughout this description, can include direct or indirect connections, including connections without direct physical contact.

The vehicle 100 can include an autonomous driving module 120. The autonomous driving module 120 can be implemented as computer readable program code that, when executed by a processor, implement one or more of the various processes described herein, including, for example, determining current driving maneuvers for the vehicle 100, future driving maneuvers for the vehicle 100 and/or modifications to a current driving maneuver of the vehicle 100. The autonomous driving module 120 can also cause, directly or indirectly, such driving maneuvers or modifications thereto to be implemented. The autonomous driving module 120 can be a component of the processor 110, or the autonomous driving module 120 can be executed on and/or distributed among other processing systems to which the processor 110 is operatively connected.

The autonomous driving module 120 can be a component of the processor 110, or the autonomous driving module 120 can be executed on and/or distributed among other processing systems to which the processor 110 is operatively connected. The autonomous driving module 120 can include instructions (e.g., program logic) executable by the processor 110. Such instructions can include instructions to execute various vehicle functions and/or to transmit data to, receive data from, interact with, and/or control the vehicle 100 or one or more systems thereof (e.g., one or more of vehicle systems 145). Alternatively or in addition, the data store 115 may contain such instructions.

The vehicle 100 can include a sensor system 125. The sensor system 125 can include one or more sensors. "Sensor" means any device, component and/or system that can detect, determine, assess, monitor, measure, quantify and/or sense something. The one or more sensors can be configured to detect, determine, assess, monitor, measure, quantify and/or sense in real-time. As used herein, the term "real-time" means a level of processing responsiveness that a user or system senses as sufficiently immediate for a particular process or determination to be made, or that enables the processor to keep up with some external process.

In arrangements in which the sensor system 125 includes a plurality of sensors, the sensors can work independently from each other. Alternatively, two or more of the sensors can work in combination with each other. The sensor system 125 and/or the one or more sensors can be operatively connected to the processor 110, the data store 115, the autonomous driving module 120 and/or other element of the vehicle 100.

The sensor system 125 can include any suitable type of sensor. For example, the sensor system 125 can include one or more sensors configured to detect, determine, assess, monitor, measure, quantify and/or sense information about the vehicle 100. Alternatively or in addition, the sensor system 125 can include one or more sensors configured to detect, determine, assess, monitor, measure, quantify and/or sense information about the external environment in which the vehicle 100 is located, including information about objects in the external environment. Such objects may be stationary object or moving objects. Alternatively or in addition to one or more of the above examples, the sensor system 125 can include one or more sensors configured to detect, determine, assess, monitor, measure, quantify and/or sense the location of the vehicle 100 and/or the location of objects in the environment relative to the vehicle 100. Various examples of these and other types of sensors will be described herein. It will be understood that the embodiments are not limited to the particular sensors described.

The sensor system 125 can include one or more sensors configured to detect, determine, assess, monitor, measure, quantify and/or sense position and orientation changes of the vehicle 100, such as, for example, based on inertial acceleration. In one or more arrangements, the sensor system 125 can include accelerometers, gyroscopes and/or other suitable sensors. The sensor system 125 can include sensors that can monitor one or more internal systems of the vehicle 100 (e.g., an $O_2$ monitor, a fuel gauge, an engine oil temperature, coolant temperature, etc.).

The sensor system 125 can include one or more environment sensors. The environment sensors can be configured to detect, determine, assess, monitor, measure, quantify and/or sense objects in at least a portion of the external environment of the vehicle 100 and/or information/data about such objects. The one or more environment sensors can be provided in any suitable location of the vehicle. Various examples of the environment sensors will be described herein. However, it will be understood that the embodiments are not limited to the particular sensors described.

In one or more arrangements, one or more of the environment sensors can use at least in part radio signals (e.g., RADAR based sensors). The one or more radio-based sensors can be configured to detect, determine, assess, monitor, measure, quantify and/or sense, directly or indirectly, the presence of one or more objects in the external environment of the vehicle 100, the position of each detected object relative to the vehicle 100, the distance between each detected object and the vehicle 100 in one or more directions (e.g., in the longitudinal direction, the lateral direction and/or other direction(s)), the speed of each detected object and/or the movement of each detected object.

In one or more arrangements, one or more of the environment sensors can use at least in part lasers. For instance, one or more of the environment sensors can be or included as part of a laser rangefinder or a LIDAR. Such devices can include a laser source and/or laser scanner configured to emit a laser and a detector configured to detect reflections of the laser. The laser rangefinder or LIDAR may be configured to operate in a coherent or an incoherent detection mode. The one or more laser-based sensors can be configured to detect, determine, assess, monitor, measure, quantify and/or sense, directly or indirectly, the presence of one or more objects in the external environment of the vehicle 100, the position of each detected object relative to the vehicle 100, the distance between each detected object and the vehicle 100 in one or more directions (e.g., in the longitudinal direction, the lateral direction and/or other direction(s)), the speed of each detected object and/or the movement of each detected object.

In one or more arrangements, one or more of the environment sensors can use at least in part ultrasound. Such sensors can include an ultrasound source configured to emit ultrasonic signals and a detector configured to detect reflections of the ultrasonic signal. The one or more ultrasound-based environment sensors can be configured to detect, determine, assess, monitor, measure, quantify and/or sense, directly or indirectly, the presence of one or more objects in the external environment of the vehicle 100, the position of each detected object relative to the vehicle 100, the distance between each detected object and the vehicle 100 in one or more directions (e.g., in the longitudinal direction, the lateral direction and/or other direction(s)), the speed of each detected object and/or the movement of each detected object. Such detecting can be based on a characteristic (e.g., the intensity) of a reflected ultrasonic signal.

In one or more arrangements, the sensor system 125 can include a camera system. The camera system can include a one or more cameras. "Camera" is defined as any device, component, and/or system that can capture visual data. "Visual data" includes video and/or image information/data. The visual data can be in any suitable form.

In one or more arrangements, one or more of the cameras can include a lens (not shown) and an image capture element (not shown). The image capture element can be any suitable type of image capturing device or system, including, for example, an area array sensor, a Charge Coupled Device (CCD) sensor, a Complementary Metal Oxide Semiconductor (CMOS) sensor, a linear array sensor, a CCD (monochrome). The image capture element may capture images in any suitable wavelength on the electromagnetic spectrum. The image capture element may capture color images and/or grayscale images. One or more of the cameras can be configured with zoom in and/or zoom out capabilities.

In one or more arrangements, one or more of the cameras can be oriented, positioned, configured, operable and/or arranged to capture visual data from at least a portion of the external environment of the vehicle 100. The one or more cameras can be located in any suitable portion of the vehicle 100. For instance, one or more of the cameras can be located within the vehicle 100. One or more of the cameras can be located on the exterior of the vehicle 100. One or more of the cameras can be located on or exposed to the exterior of the vehicle 100.

The position of one or more of the cameras can be fixed such that its position does not change relative to the vehicle 100. One or more of the cameras can be movable so that its position can change to allow visual data from different portions of the external environment of the vehicle 100 to be captured. The one or more cameras and/or the movement of the one or more cameras can be controlled by the sensor system 125, the processor 110, the autonomous driving module 120, and/or other module(s).

Alternatively or in addition to any of the sensors described above, the sensor system 125 can include other types of sensors. The sensor system 125, the processor 110, the autonomous driving module 120, and/or other module(s) can be operable to control movements of one or more of the sensors of the sensor system 125. It should be noted that any of the sensors described herein can be provided in any suitable location with respect to the vehicle 100. For instance, one or more sensors can be located within the vehicle 100, one or more sensors can be located on the exterior of the vehicle and/or one or more sensors can be located so as to be exposed to the exterior of the vehicle 100.

In some arrangements, the sensor system 125, the processor 110, the autonomous driving module 120, and/or other module(s) can be configured to detect, determine, assess, monitor, measure, quantify, and/or sense, directly or indirectly, one or more aspects, characteristics and/or properties of a detected object. For example, the sensor system 125, the processor 110, the autonomous driving module 120, and/or other module(s) can be configured to detect, determine, assess, monitor, measure, quantify and/or sense, directly or indirectly, the size, relative size, length, width, height, a dimension, the material, a material property, the speed, the acceleration and/or the trajectory of a detected object.

The vehicle 100 can include an input system 130. An "input system" is defined as any device, component, system, element or arrangement or groups thereof that enable information/data to be entered into a machine. The input system 130 can receive an input from a vehicle occupant (e.g., a driver or a passenger). Any suitable input system 130 can be used, including, for example, a keypad, display, touch screen, multi-touch screen, button, joystick, mouse, trackball, microphone and/or combinations thereof.

The vehicle 100 can include an output system 135. An "output system" is defined as any device, component, system, element or arrangement or groups thereof that enable information/data to be presented to a vehicle occupant (e.g., a person, a vehicle occupant, etc.). The output system 135 can present information/data to a vehicle occupant. The output system 135 can include a display, as described above. Alternatively or in addition, the output system 135 may include a microphone, earphone and/or speaker. Some components of the vehicle 100 may serve as both a component of the input system 130 and a component of the output system 135.

The vehicle 100 can include a haptic indication module 140. The haptic indication module 140 can be implemented as computer readable program code that, when executed by a processor, implement one or more of the various processes described herein, including, for example, determining one or more appropriate haptic indicators to provide based on future planned driving maneuvers of the vehicle 100. Such haptic indicators can include one or more vehicle seat movements, as will be described herein. The one or more vehicle seat movements can correspond to a sensation that a vehicle seat occupant will experience while the vehicle 100 is performing at least a portion of the future planned driving maneuver. Alternatively or in addition, the one or more vehicle seat movements can compensate for a sensation that a vehicle seat occupant will experience while the vehicle 100 is performing at least a portion of the future planned driving maneuver.

The haptic indication module 140 can also cause, directly or indirectly, such haptic indicators (e.g., movement of one or more vehicle seats) to be implemented. The haptic indication module 140 can be a component of the processor 110, or the haptic indication module 140 can be executed on and/or distributed among other processing systems to which the processor 110 is operatively connected.

The haptic indication module 140 can include instructions (e.g., program logic) executable by the processor 110. Such instructions can include instructions to execute various vehicle functions. Alternatively or in addition, such instructions can include instructions to control one or more vehicle seats of the vehicle 100. Alternatively or in addition, the data store 115 may contain such instructions.

The vehicle 100 can include one or more vehicle seats 141. FIG. 2 is a partially diagrammatic view of an interior portion 200 of the vehicle 100. The vehicle seats 141 can be operatively connected to the vehicle 100 in any suitable manner. In one or more arrangements, such as is shown in FIG. 2, the vehicle 100 can include a plurality of vehicle seats 141. For instance, the vehicle 100 can include a driver seat 142 and a plurality of passenger seats 143. However, it will be understood that the arrangement shown in FIG. 2 is merely an example, and the subject matter described herein is not limited to any particular arrangement and/or quantity of vehicle seats 141.

The one or more vehicle seats 141 can have any suitable form. For instance, the one or more vehicle seats 141 can include at least a seat portion 147. In one or more arrangements, the one or more vehicle seats 141 can also include a back portion 148. For instance, one or more user control elements can be provided to enable a user to selectively change the position of the seat portion 147 and/or the back portion 148. The vehicle seat 141 can include one or more arm rests and/or a headrest 149.

For instance, one or more of the vehicle seats 141 can be configured to be movable in a plurality of directions and/or in a plurality of different manner. For instance, one or more of the vehicle seats 141 can be configured for pivoting, tilting, sliding, rotational, linear, curvilinear, rectilinear, reciprocal, random, oscillation, and/or twisting motions, or any combinations thereof. One or more of the vehicle seats 141 or a portion thereof can be configured to move in three dimensions.

In one or more arrangements, one or more of the vehicle seats 141 or a portion thereof (e.g., the seat portion, the back portion, the arm rest, the headrest) can be configured to move forward and/or rearward in the longitudinal direction 106. Any suitable range of motion can be provided in the longitudinal direction 106. In one or more arrangements, one or more of the vehicle seats 141 or a portion thereof can be configured to tilt forward and/or rearward generally in the longitudinal direction 106.

Alternatively or in addition, one or more of the vehicle seats 141 or a portion thereof can be configured to move left and/or right in the lateral direction 108. Any suitable range of motion can be provided in the lateral direction 108. In one or more arrangements, one or more of the vehicle seats 141 or a portion thereof can be configured to tilt left and/or right generally in the lateral direction 108.

In one or more arrangements, one or more of the vehicle seats 141 or a portion thereof can be configured to move in a substantially vertical direction (e.g., a direction that is substantially orthogonal to the longitudinal direction 106 and to the lateral direction 108). Any suitable range of motion can be provided in the substantially vertical direction. In one or more arrangements, one or more of the vehicle seats 141 or a portion thereof can be configured to move rectilinearly upward and/or downward generally in the substantially vertical direction.

In one or more arrangements, a portion of one or more vehicle seats 141 can be movable. For instance, the seat portion 147 and/or the back portion 148 of one or more vehicle seats 141 can be movable. The seat portion 147 and/or the back portion 148 can be movable with respect to each other. For instance, the back portion 148 can be pivotable relative to the seat portion 147. Thus, the back portion 148 can have an upright position and one or more reclined positions. Alternatively or in addition, the seat portion 147 can be pivotable relative to the back portion 148.

One or more of the vehicle seats 141 can have any combination of the above motions and/or other motions. One or more of the vehicle seats 141 can have any suitable range of motion. In one or more arrangements, one or more of the vehicle seats 141 or a portion thereof can have a generally semi-spherical range of motion.

In one or more arrangements, one or more portions of at least one of the vehicle seats 141 can be configured to vibrate to provide a haptic indication. To that end, there can be one or more vibration energy elements (not shown) associated with the vehicle seat 141. The one or more vibration energy elements can be selectively activated to provide a haptic indication to an occupant of the vehicle seat 141.

The vehicle 100 can include one or more vehicle seat actuators 144. The one or more vehicle seat actuators 144 can be operatively connected to one or more of the vehicle seats 141. The vehicle seat actuators 144 can be any element or combination of elements operable to modify, adjust and/or alter one or more of the vehicle seats 141, portions thereof, and/or components thereof to responsive to receiving signals or other inputs from the processor 110 and/or the haptic indication module 140. The processor 110 and/or the haptic indication module 140 can be operatively connected to the vehicle seat actuators 144. Any suitable actuator can be used. For instance, the one or more vehicle seat actuators 144 can include motors, pneumatic actuators, hydraulic pistons, relays, solenoids, and/or piezoelectric actuators, just to name a few possibilities.

In one or more arrangements, only one of the vehicle seats 141, such as the driver's seat, may be configured to provide a haptic indication. In one or more arrangements, a plurality of the vehicle seats 141 may be configured to provide a haptic indication. In such case, the plurality of vehicle seats 141 can be configured to provide the same haptic indication. Alternatively, the plurality of vehicle seats 141 can be configured to provide different haptic indications. The plurality of vehicle seats 141 can be controlled individually or collectively to provide the haptic indications.

The vehicle 100 can include one or more vehicle systems 145. Various examples of the one or more vehicle systems 145 are shown in FIG. 1. However, the vehicle 100 can include more, fewer or different systems. It should be appreciated that although particular vehicle systems are separately defined, each or any of the systems or portions thereof may be otherwise combined or segregated via hardware and/or software within the vehicle 100.

The vehicle 100 can include a propulsion system 150. The propulsion system 150 can include one or more mechanisms, devices, elements, components, systems, and/or combinations thereof, now known or later developed, configured to provide powered motion for the vehicle 100. The propulsion system 150 can include an engine and an energy source.

The engine can be any suitable type of engine or motor, now known or later developed. For instance, the engine can be an internal combustion engine, an electric motor, a steam engine, and/or a Stirling engine, just to name a few possibilities. In some embodiments, the propulsion system could include a plurality of engine types. For instance, a gas-electric hybrid vehicle can include a gasoline engine and an electric motor.

The energy source can be any suitable source of energy that can be used to at least partially power the engine. The engine can be configured to convert the energy source into mechanical energy. Examples of energy sources include gasoline, diesel, propane, hydrogen, other compressed gas-based fuels, ethanol, solar panels, batteries, and/or other sources of electrical power. Alternatively or in addition, the energy source can include fuel tanks, batteries, capacitors, and/or flywheels. In some embodiments, the energy source can be used to provide energy for other systems of the vehicle 100.

The vehicle 100 can include wheels, tires and/or tracks. Any suitable type of wheels, tires and/or tracks can be used. In one or more arrangements, the wheels, tires and/or tracks of the vehicle 100 can be configured to rotate differentially with respect to other wheels, tires and/or tracks of the vehicle 100. The wheels, tires and/or tracks can be made of any suitable material.

The vehicle 100 can include a braking system 155. The braking system 155 can include one or more mechanisms, devices, elements, components, systems, and/or combinations thereof, now known or later developed, configured to decelerate the vehicle 100. As an example, the braking system 155 can use friction to slow the wheels/tires. The braking system 155 can convert the kinetic energy of the wheels/tires to electric current.

Further, the vehicle 100 can include a steering system 160. The steering system 160 can include one or more mechanisms, devices, elements, components, systems, and/or combinations thereof, now known or later developed, configured to adjust the heading of the vehicle 100.

The vehicle 100 can include a throttle system 165. The throttle system 165 can include one or more mechanisms, devices, elements, components, systems, and/or combinations thereof, now known or later developed, configured to control the operating speed of an engine/motor of the vehicle 100 and, in turn, the speed of the vehicle 100.

The vehicle 100 can include a transmission system 170. The transmission system 170 can include one or more mechanisms, devices, elements, components, systems, and/or combinations thereof, now known or later developed, configured to transmit mechanical power from the engine/motor of the vehicle 100 to the wheels/tires. For instance, the transmission system 170 can include a gearbox, clutch, differential, drive shafts, and/or other elements. In arrangements where the transmission system 170 includes drive shafts, the drive shafts can include one or more axles that are configured to be coupled to the wheels/tires.

The vehicle 100 can include a signaling system 175. The signaling system 175 can include one or more mechanisms, devices, elements, components, systems, and/or combinations thereof, now known or later developed, configured to provide illumination for the driver of the vehicle 100 and/or to provide information with respect to one or more aspects of the vehicle 100. For instance, the signaling system 175 can provide information regarding the vehicle's presence, position, size, direction of travel, and/or the driver's intentions regarding direction and speed of travel. For instance, the signaling system 175 can include headlights, taillights, brake lights, hazard lights and turn signal lights.

The vehicle 100 can include a navigation system 180. The navigation system 180 can include one or more mechanisms, devices, elements, components, systems, applications and/or combinations thereof, now known or later developed, configured to determine the geographic location of the vehicle 100 and/or to determine a travel route for the vehicle 100.

The navigation system 180 can include one or more mapping applications to determine a travel route for the vehicle 100. For instance, a driver or passenger may input an origin and a destination. The mapping application can determine one or more suitable travel routes between the origin and the destination. A travel route may be selected based on one or more parameters (e.g., shortest travel distance, shortest amount of travel time, etc.). In some arrangements, the navigation system 180 can be configured to update the travel route dynamically while the vehicle 100 is in operation.

The navigation system 180 can include a global positioning system, a local positioning system or a geolocation system. The navigation system 180 can be implemented with any one of a number of satellite positioning systems, such as the United States Global Positioning System (GPS), the Russian Glonass system, the European Galileo system, the Chinese Beidou system, or any system that uses satellites from a combination of satellite systems, or any satellite system developed in the future, including the planned Chinese COMPASS system and the Indian Regional Navigational Satellite System. Further, the navigation system 180 can use Transmission Control Protocol (TCP) and/or a Geographic information system (GIS) and location services.

The navigation system 180 may include a transceiver configured to estimate a position of the vehicle 100 with respect to the Earth. For example, navigation system 180 can include a GPS transceiver to determine the vehicle's latitude, longitude and/or altitude. The navigation system 180 can use other systems (e.g., laser-based localization systems, inertial-aided GPS, and/or camera-based localization) to determine the location of the vehicle 100.

Alternatively or in addition, the navigation system 180 can be based on access point geolocation services, such as using the W3C Geolocation Application Programming Interface (API). With such a system, the location of the vehicle 100 can be determined through the consulting of location information servers, including, for example, Internet protocol (IP) address, Wi-Fi and Bluetooth Media Access Control (MAC) address, radio-frequency identification (RFID), Wi-Fi connection location, or device GPS and Global System for Mobile Communications (GSM)/code division multiple access (CDMA) cell IDs. Thus, it will be understood that the specific manner in which the geographic position of the vehicle 100 is determined will depend on the manner of operation of the particular location tracking system used.

The processor 110 and/or the autonomous driving module 120 can be operatively connected to communicate with the various vehicle systems 145 and/or individual components thereof. For example, returning to FIG. 1, the processor 110 and/or the autonomous driving module 120 can be in communication to send and/or receive information from the various vehicle systems 145 to control the movement, speed, maneuvering, heading, direction, etc. of vehicle 100. The processor 110 and/or the autonomous driving module 120 may control some or all of these vehicle systems 145 and, thus, may be partially or fully autonomous.

The processor 110 and/or the autonomous driving module 120 may be operable to control the navigation and/or maneuvering of the vehicle 100 by controlling one or more of the vehicle systems 145 and/or components thereof. For instance, when operating in an autonomous mode, the processor 110 and/or the autonomous driving module 120 can control the direction and/or speed of the vehicle 100. The processor 110 and/or the autonomous driving module 120 can cause the vehicle 100 to accelerate (e.g., by increasing the supply of fuel provided to the engine), decelerate (e.g., by decreasing the supply of fuel to the engine and/or by applying brakes) and/or change direction (e.g., by turning the front two wheels). As used herein, "cause" or "causing" means to make, force, compel, direct, command, instruct, and/or enable an event or action to occur or at least be in a state where such event or action may occur, either in a direct or indirect manner.

The vehicle 100 can include one or more vehicle system actuators 190. The vehicle system actuators 190 can be any element or combination of elements operable to modify, adjust and/or alter one or more of the vehicle systems 145 or components thereof to responsive to receiving signals or other inputs from the processor 110 and/or the autonomous driving module 120. Any suitable actuator can be used. For instance, the one or more vehicle system actuators 190 can include motors, pneumatic actuators, hydraulic pistons, relays, solenoids, and/or piezoelectric actuators, just to name a few possibilities.

According to arrangements described herein, the vehicle 100 can be configured to alert one or more vehicle occupants of future planned driving maneuvers. According to arrangements herein, the vehicle 100 (or one or more elements thereof) can be configured to determine a future planned driving maneuver. The vehicle 100 can further determine whether a determined future planned driving maneuver of the vehicle 100 includes a change in a current motion of the vehicle. "Change in a current motion of the vehicle" means a substantial change in the direction of motion of the vehicle and/or a substantial change in the speed of the vehicle.

In the way of non-limiting examples, a substantial change in the speed of the vehicle can occur when the vehicle 100 accelerates or decelerates. As a further example, a substantial change in the speed of the vehicle can occur when the speed of the vehicle 100 increases and/or decreases more than a predetermined amount (e.g., about 5 miles per hour (mph) or more, about 10 mph or more, about 15 mph or more, about 20 mph or more, etc.) over a current speed of the vehicle 100. As a further example, a substantial change in the speed of the vehicle can occur when the speed of the vehicle 100 increases or decreases more than a predetermined percentage (e.g., about a 5% change or more, about a 10% change or more, about a 15% change or more, about a 20% change or more, etc.) over a current speed of the vehicle 100. In the way of further non-limiting examples, a substantial change in the direction of motion of the vehicle can occur when the vehicle 100 turns to the right, and/or turns to the left. As further examples, a substantial change in the direction of motion of the vehicle can occur when the vehicle 100 turns or moves in a direction that is more than a predetermined angle (e.g., about 10 degrees or more, about 20 degrees or more, about 30 degrees or more, about 40 degrees or more, about 45 degrees or more, about 50 degrees or more, about 60 degrees or more, about 70 degrees or more, about 80 degrees or more, about 90 degrees or more, etc.) relative to the current direction of travel. As further examples, a substantial change in the direction of motion of the vehicle can occur when the vehicle 100 changes travel lanes.

In one or more arrangements, an action can be taken in response to determining that the future planned driving maneuver includes a change in the current motion of the vehicle. For instance, the action can be alerting a vehicle occupant of the future planned driving maneuver. More particularly, the action can be causing one or more vehicle seats 141 to provide a haptic indication of the future planned driving maneuver. "Haptic indication" means any information, notification, alert and/or warning that is conveyed in a way that can be perceived by the human sense of touch. The haptic indication can be provided at any suitable time. For instance, the haptic indication can be provided prior to the vehicle 100 implementing the future planned driving maneuver. As another example, the haptic indication can be provided prior to a change in the current motion of the vehicle 100. In one or more arrangements, the haptic indication can be provided at a predetermined period of time prior to implementing the future planned driving maneuver.

In this way, a vehicle seat occupant can be made aware of the future planned driving maneuver of the vehicle 100. These and other examples of possible actions will be described in greater detail throughout this description. In one or more arrangements, the processor 110, the autonomous driving module 120, the haptic indication module 140, and/or other element(s) can be configured to cause a haptic indication of the future planned driving maneuver to be provided.

Now that the various potential systems, devices, elements and/or components of the vehicle 100 have been described, various methods for operating the vehicle 100 will now be described. Referring now to FIG. 3, an example of a method 300 of operating a vehicle to alert a vehicle occupant of future planned driving maneuvers is shown. Various possible steps of the method 300 will now be described. The method 300 illustrated in FIG. 3 may be applicable to the embodiments described above in relation to FIGS. 1 and 2, but it is understood that the method 300 can be carried out with other suitable systems and arrangements. Moreover, the method 300 may include other steps that are not shown here, and in fact, the method 300 is not limited to including every step shown in FIG. 3. The steps that are illustrated here as part of the method 300 are not limited to this particular chronological order. Indeed, some of the steps may be performed in a different order than what is shown and/or at least some of the steps shown can occur simultaneously.

At block 310, it can be determined whether a future planned driving maneuver of the vehicle 100 includes a change in a current motion of the vehicle 100. Such a determination can be performed by any suitable element or combination of elements of the vehicle 100. For instance, in one or more arrangements, the determining can be performed by the processor 110, the autonomous driving module 120, and/or one or more other modules. In some arrangements, the determination can be performed continuously or at any suitable interval. In one or more arrangements, the determination can be performed when a future planned driving maneuver is determined or at any other suitable point of time. The method 300 can continue to block 320.

At block 320, responsive to determining that the future planned driving maneuver includes a change in the current motion of the vehicle 100, one or more vehicle seats 141 of the vehicle 100 can be caused to provide a haptic indication of the future planned driving maneuver. The haptic indication can be provided prior to the future planned driving maneuver being implemented or prior to being caused to be implemented. The haptic indication can be implemented by one or more elements of the vehicle 100. For instance, the haptic indication can be implemented by at least the processor 110, the autonomous driving module 120, and/or the haptic indication module 140.

Any suitable haptic indication can be provided. As an example, the haptic indication can be provided by one or more vehicle seats 141. For instance, in one or more arrangements, the haptic indication can be movement of one or more vehicle seats 141. In such case, the haptic indication can be implemented by at least the processor 110, the autonomous driving module 120, the haptic indication module 140, the vehicle seat 141, and/or the vehicle seat actuators 144. When the vehicle seat 141 is moved to provide the haptic indication, the vehicle seat 141 can remain in the moved position. Alternatively, when the vehicle seat 141 is moved to provide the haptic indication, the vehicle seat 141 can return to substantially the same position it was in before being moved. Such a return can occur immediately or after any suitable period of time. In one or more arrangements, the vehicle seat 141 can be returned prior to implementing the future planned driving maneuver and/or prior to a change in motion of the vehicle.

The haptic indication can be have any suitable duration. The haptic indication can be provided any suitable number of times. For instance, the haptic indication can be provided a single time. In one or more arrangements, the haptic indication can be provided a plurality of times. In such case, the haptic indication can be performed periodically, irregularly, or even randomly.

In one or more arrangements, when the haptic indication is movement of one or more vehicle seats 141, the movement of the vehicle seat 141 can correspond to a sensation that a vehicle seat occupant will experience during at least a portion of the future planned driving maneuver. "Correspond to a sensation that a vehicle seat occupant will experience during at least a portion of the future planned driving maneuver" means that the vehicle seat 141 is moved in such that the vehicle seat occupant will experience a sensation that is similar or identical to the sensation that the vehicle seat occupant will experience at least at some point when the vehicle 100 actually performs the future planned driving maneuver.

Various non-limiting examples of moving the vehicle seat 141 in a way that corresponds to a sensation that a vehicle seat occupant will experience during at least a portion of the future planned driving maneuver will now be described. For instance, when the future planned driving maneuver is acceleration, a vehicle seat occupant may actually be or may feel like he or she is being pushed, moved, and/or forced backward in the longitudinal direction 106 due to the associated forces acting upon the vehicle 100 and/or the vehicle seat occupant. Accordingly, in such case, the movement of the vehicle seat 141 that corresponds to a sensation that a vehicle seat occupant will experience during at least a portion of the future planned driving maneuver can include moving the vehicle seat 141 rearward in the longitudinal direction 106. That is, the vehicle seat 141 can be moved rearward toward the back end 102 of the vehicle 100. Such movement can include tilting the vehicle seat 141, tilting the seat portion 147, tilting the back portion 148, tilting the headrest 149, and/or tilting one or more arm rests rearward in the longitudinal direction 106. Alternatively or in addition, such movement can include rectilinear movement of the vehicle seat 141 or a portion thereof rearward in the longitudinal direction 106.

As another example, when the future planned driving maneuver is deceleration, a vehicle seat occupant may actually be or may feel like he or she is being pushed, moved, and/or forced forward in the longitudinal direction 106 due to the associated forces acting upon the vehicle 100 and/or the vehicle seat occupant. Accordingly, in such case, the movement of the vehicle seat that corresponds to a sensation that a vehicle seat occupant will experience during at least a portion of the future planned driving maneuver can includes moving the vehicle seat 141 forward in the longitudinal direction. That is, the vehicle seat 141 can be moved rearward toward the front end 101 of the vehicle 100. Such movement can include tilting the vehicle seat 141, tilting the seat portion 147, tilting the back portion 148, tilting the headrest 149, and/or tilting one or more arm rests forward in the longitudinal direction 106. Alternatively or in addition, such movement can include rectilinear movement of the vehicle seat 141 or a portion thereof forward in the longitudinal direction 106.

As a further example, when the future planned driving maneuver is a left turn or a left curve, a vehicle seat occupant may actually be or may feel like he or she is being pushed, moved, and/or forced at least to the right in the lateral direction 108 due to the associated forces acting upon the vehicle 100, the vehicle seat 141, and/or the vehicle seat occupant. Accordingly, in such case, the movement of the vehicle seat 141 that corresponds to a sensation that a vehicle seat occupant will experience during at least a portion of the future planned driving maneuver can include moving the vehicle seat 141 to the right in the lateral direction 108. That is, the vehicle seat 141 can be moved to the right toward the right lateral side 104 of the vehicle 100. Such movement can include tilting the vehicle seat 141, tilting the seat portion 147, tilting the back portion 148, tilting the headrest 149, and/or tilting one or more arm rests to the right in the lateral direction 108. Alternatively or in addition, such movement can include rectilinear movement of the vehicle seat 141 or a portion thereof to the right in the lateral direction 108.

As an additional example, when the future planned driving maneuver is a right turn or a right curve, a vehicle seat occupant may actually be or may feel like he or she is being pushed, moved, and/or forced at least to the left in the lateral direction 108 due to the associated forces acting upon the vehicle 100 and/or the vehicle seat occupant. Accordingly, in such case, the movement of the vehicle seat 141 that corresponds to a sensation that a vehicle seat occupant will experience during at least a portion of the future planned driving maneuver can include moving the vehicle seat 141 to the left in the lateral direction 108. That is, the vehicle seat 141 can be moved to the left toward the left lateral side 103 of the vehicle 100. Such movement can include tilting the vehicle seat 141, tilting the seat portion 147, tilting the back portion 148, tilting the headrest 149, and/or tilting one or more arm rests to the left in the lateral direction 108. Alternatively or in addition, such movement can include rectilinear movement of the vehicle seat 141 or a portion thereof to the left in the lateral direction 108.

While the above description is directed to arrangements in which the vehicle seat 141 is moved corresponding to a sensation that a vehicle seat occupant will experience during at least a portion of the future planned driving maneuver, it will be appreciated that arrangements are not limited to this type of movement. Indeed, the vehicle seat 141 can be moved in other ways. For instance, the vehicle seat 141 can be moved to compensate for a sensation that a vehicle seat occupant will experience during at least a portion of the future planned driving maneuver. In this way, the vehicle seat occupant may not experience the sensation or the feeling will be reduced.

As a further example, the vehicle seat 141 can be moved in substantially the same direction in which the vehicle will move during at least a portion of the future planned driving maneuver. For instance, when the future planned driving maneuver is a left turn or a left curve, the movement of the vehicle seat 141 can include moving the vehicle seat 141 to the left in the lateral direction 108. That is, the vehicle seat 141 can be moved left toward the left lateral side 103 of the vehicle 100. Such movement can include tilting the vehicle seat 141, tilting the seat portion 147, tilting the back portion 148, tilting the headrest 149, and/or tilting one or more arm rests to the left in the lateral direction 108. Alternatively or in addition, such movement can include rectilinear movement of the vehicle seat 141 or a portion thereof to the left in the lateral direction 108. In such ways, a vehicle occupant can be apprised of an upcoming left turn or left curve.

As an additional example, when the future planned driving maneuver is a right turn or a right curve, the movement of the vehicle seat 141 can include moving the vehicle seat 141 to the right in the lateral direction 108. That is, the vehicle seat 141 can be moved right toward the right lateral side 104 of the vehicle 100. Such movement can include tilting the vehicle seat 141, tilting the seat portion 147, tilting the back portion 148, tilting the headrest 149, and/or tilting one or more arm rests to the right in the lateral direction 108. Alternatively or in addition, such movement can include rectilinear movement of the vehicle seat 141 or a portion thereof to the right in the lateral direction 108. In such ways, a vehicle occupant can be apprised of an upcoming right turn or right curve.

After block 320, the method 300 can end. Alternatively, the method 300 can return to block 310. As a further alternative, the method 300 can include additional blocks (not shown). For instance, the vehicle 100 can be caused to implement the future planned driving maneuver. In one or more arrangements, the processor 110 and/or the autonomous driving module 120 can cause the vehicle 100 to implement the future planned driving maneuver. The processor 110 and/or the autonomous driving module 120 can be operatively connected to one or more of the vehicle systems 145 to cause the future planned driving maneuver to be implemented. In one or more arrangements, the processor 110 and/or the autonomous driving module 120 can be operable to control the one or more vehicle system actuators 190, which can control one or more of the vehicle systems 145 or portions thereof to implement the future planned driving maneuver.

It should be noted that causing the future planned driving maneuver to be implemented can be performed automatically. In one or more arrangements, a vehicle occupant (e.g., a driver and/or other passenger) can be prompted to provide permission to implement the future planned driving maneuver. The vehicle occupant can be prompted in any suitable manner. For instance, a prompt can be indicated by the movement(s) of the vehicle seat 141 described above. Alternatively or in addition, a prompt can be presented on a display within the vehicle 100. Alternatively or in addition, the prompt can be audibly output to the vehicle occupant over one or more audial channels. Other forms of prompting can be used as an alternative or in addition to the above-described forms of prompting. Responsive to receiving an input corresponding to a vehicle occupant's approval to implement the future driving maneuver, the vehicle 100 can be caused to implement the future planned driving maneuver. Responsive to receiving an input corresponding to a vehicle occupant's disapproval of implementing the future driving maneuver or if a vehicle occupant does not respond to prompting, the vehicle 100 may not implement the future planned driving maneuver or may switch the vehicle 100 to a manual mode.

One non-limiting example of the operation of the vehicle 100 in accordance with the method 300 will now be described. The vehicle 100 can be currently traveling in a travel lane of a road. The vehicle 100 can be traveling at a substantially constant speed, such as 45 miles per hour. The vehicle 100 can be heading toward an intersection formed by the current road and a traverse road. The intersection can be a four way stop.

The current travel path of the vehicle 100 can include passing through the intersection. However, due to the intersection being a four way stop, the vehicle 100 must stop before proceeding through the intersection. Accordingly, the vehicle 100 can determine a future planned driving maneuver is stopping at the intersection. However, from a vehicle occupant's perspective, it may not be immediately clear that the vehicle 100 recognizes that there is an upcoming stop that requires the vehicle 100 to stop. Thus, the vehicle occupant may become uncomfortable, wondering whether the vehicle 100 knows that it must stop.

At a certain point, the vehicle 100 must begin to activate the braking system 155 to gradually bring the vehicle 100 to a stop. Accordingly, the vehicle 100 can determine that such actions would include a change in a current motion of the vehicle 100.

The vehicle 100 can provide a haptic indication to one or more vehicle occupants (e.g., a driver and/or one or more passengers). Because the future planned driving maneuver includes decelerating, the haptic indication can be provided to one or more vehicle occupants via a respective vehicle seat 141. In such case, the vehicle seat can be caused to provide a haptic indication, such as by moving the vehicle seat 141. The haptic indication is provided prior to the vehicle 100 implementing the future planned driving maneuver by activating the braking system 155. Thus, by providing such a haptic indication, a vehicle occupant can be assured that the vehicle 100 understands that it must come to a stop even if it is not necessary for the vehicle 100 to begin decelerating.

Also, if the haptic indication is one that corresponds to a sensation that a vehicle seat occupant will experience during at least a portion of the future planned driving maneuver, the vehicle seat occupant can gain an understanding of the future planned driving maneuver of the vehicle 100 based on the movement of the vehicle seat 141. In this example, the vehicle seat 141 can be tilted forward. Based on such movement, the vehicle seat occupant would recognize that a future driving action of the vehicle 100 will cause the vehicle 100 to decelerate or stop.

It will be appreciated that arrangements described herein can provide numerous benefits, including one or more of the benefits mentioned herein. For example, arrangements described herein can increase driver acceptance and comfort levels with autonomous vehicle systems. Arrangements described herein can potentially improve the safe operation of the autonomous vehicle. Arrangements described herein can reduce amount of experienced forces during the vehicle's execution of the future planned driving maneuver. Arrangements described herein can, in some instances, allow a vehicle occupant to physically prepare for an upcoming change in motion of the vehicle (possibly even subconsciously), thereby increasing perceived comfort.

The flowcharts and block diagrams in the figures illustrate the architecture, functionality, and operation of possible implementations of systems, methods and computer program products according to various embodiments. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The systems, components and/or processes described above can be realized in hardware or a combination of hardware and software and can be realized in a centralized fashion in one processing system or in a distributed fashion where different elements are spread across several interconnected processing systems. Any kind of processing system or other apparatus adapted for carrying out the methods described herein is suited. A typical combination of hardware and software can be a processing system with computer-usable program code that, when being loaded and executed, controls the processing system such that it carries out the methods described herein. The systems, components and/or processes also can be embedded in a computer-readable storage, such as a computer program product or other data programs storage device, readable by a machine, tangibly embodying a program of instructions executable by the machine to perform methods and processes described herein. These elements also can be embedded in an application product which comprises all the features enabling the implementation of the methods described herein and, which when loaded in a processing system, is able to carry out these methods.

Furthermore, arrangements described herein may take the form of a computer program product embodied in one or more computer-readable media having computer-readable program code embodied, e.g., stored, thereon. Any combination of one or more computer-readable media may be utilized. The computer-readable medium may be a computer-readable signal medium or a computer-readable storage medium. The phrase "computer-readable storage medium" means a non-transitory storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: an electrical connection having one or more wires, a portable computer diskette, a hard disk drive (HDD), a solid state drive (SSD), a random access memory (RAM), a read-only memory (ROM), an erasable programmable read-only memory (EPROM or Flash memory), an optical fiber, a portable compact disc read-only memory (CD-ROM), a digital versatile disc (DVD), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

Program code embodied on a computer-readable medium may be transmitted using any appropriate medium, including but not limited to wireless, wireline, optical fiber, cable, RF, etc., or any suitable combination of the foregoing. Computer program code for carrying out operations for aspects of the present arrangements may be written in any combination of one or more programming languages, including an object oriented programming language such as Java™, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e. open language). The phrase "at least one of . . . and . . . " as used herein refers to and encompasses any and all possible combinations of one or more of the associated listed items. As an example, the phrase "at least one of A, B and C" includes A only, B only, C only, or any combination thereof (e.g., AB, AC, BC or ABC).

Aspects herein can be embodied in other forms without departing from the spirit or essential attributes thereof. Accordingly, reference should be made to the following claims, rather than to the foregoing specification, as indicating the scope of the invention.

What is claimed is:

1. A method of operating an autonomous vehicle, the autonomous vehicle including a processor, a vehicle seat, and one or more vehicle seat actuators, the one or more vehicle seat actuators being operatively connected to the vehicle seat and to the processor, the method comprising:
   determining, using the processor, whether a future planned driving maneuver of the autonomous vehicle includes a change in a current motion of the autonomous vehicle; and
   responsive to determining that the future planned driving maneuver includes a change in the current motion of the autonomous vehicle, activating at least one of the one or more vehicle seat actuators to cause the vehicle seat to provide a haptic indication of the future planned driving maneuver prior to implementing the future planned driving maneuver, whereby a seat occupant is alerted to the future planned driving maneuver.

2. The method of claim 1, wherein the haptic indication includes a movement of the vehicle seat.

3. The method of claim 2, wherein the movement of the vehicle seat corresponds to a sensation that a vehicle seat occupant will experience during at least a portion of the future planned driving maneuver.

4. The method of claim 3, wherein, when the future planned driving maneuver is acceleration, the movement of the vehicle seat that corresponds to a sensation that a vehicle seat occupant will experience during at least a portion of the future planned driving maneuver includes tilting the vehicle seat in a rearward direction.

5. The method of claim 3, wherein, when the future planned driving maneuver is deceleration, the movement of the vehicle seat that corresponds to a sensation that a vehicle seat occupant will experience during at least a portion of the future planned driving maneuver includes tilting the vehicle seat in a forward direction.

6. The method of claim 3, wherein, when the future planned driving maneuver is a turn or a curve, the movement of the vehicle seat that corresponds to a sensation that a vehicle seat occupant will experience during at least a portion of the future planned driving maneuver includes tilting the vehicle seat in a lateral direction opposite to the direction of the turn or the curve.

7. The method of claim 2, wherein, when the future planned driving maneuver is a turn or a curve, the movement of the vehicle seat includes moving the vehicle seat in substantially the same lateral direction as the direction of the turn or the curve.

8. The method of claim 1, wherein causing the vehicle seat to provide a haptic indication of the future planned driving maneuver prior to implementing the future planned driving maneuver includes causing the vehicle seat to provide a haptic indication at a predetermined period of time prior to implementing the future planned driving maneuver.

9. A system for an autonomous vehicle comprising:
   a vehicle seat;
   one or more vehicle seat actuators, the one or more vehicle seat actuators being operatively connected to the vehicle seat; and
   a processor operatively connected to the one or more vehicle seat actuators, the processor being programmed to initiate executable operations comprising:
      determining whether a future planned driving maneuver of the autonomous vehicle includes a change in a current motion of the autonomous vehicle; and
      responsive to determining that the future planned driving maneuver includes a change in the current motion of the autonomous vehicle, activating at least one of the one or more vehicle seat actuators to cause the vehicle seat to provide a haptic indication of the future planned driving maneuver prior to implementing the future planned driving maneuver.

10. The system of claim 9, wherein the haptic indication includes
    wherein a movement of the vehicle seat in one or more directions.

11. The system of claim 10, wherein the movement of the vehicle seat corresponds to a sensation that a vehicle seat occupant will experience during at least a portion of the future planned driving maneuver.

12. The system of claim 11, wherein, when the future planned driving maneuver is acceleration, the movement of the vehicle seat that corresponds to a sensation that a vehicle seat occupant will experience during at least a portion of the future planned driving maneuver includes tilting the vehicle seat in a rearward direction.

13. The system of claim 11, wherein, when the future planned driving maneuver is deceleration, the movement of the vehicle seat that corresponds to a sensation that a vehicle seat occupant will experience during at least a portion of the future planned driving maneuver includes tilting the vehicle seat in a forward direction.

14. The system of claim 11, wherein, when the future planned driving maneuver is a turn or a curve, the movement of the vehicle seat that corresponds to a sensation that a vehicle seat occupant will experience during at least a portion of the future planned driving maneuver includes tilting the vehicle seat in a lateral direction opposite to the direction of the turn or the curve.

15. The system of claim 10, wherein, when the future planned driving maneuver is a turn or a curve, the movement of the vehicle seat includes moving the vehicle seat in substantially the same lateral direction as the direction of the turn or the curve.

16. A computer program product for operating an autonomous vehicle, the autonomous vehicle including a vehicle seat and one or more vehicle seat actuators, the one or more vehicle seat actuators being operatively connected to the vehicle seat, the computer program product comprising a non-transitory computer readable storage medium having program code embodied therein, the program code executable by a processor to perform a method comprising:
   determining whether a future planned driving maneuver of the autonomous vehicle includes a change in a current motion of the autonomous vehicle; and responsive to determining that the future planned driving maneuver includes a change in the current motion of the autonomous vehicle, activating one or more vehicle seat actuators to cause the vehicle seat to provide a haptic indication of the future planned driving maneuver prior to implementing the future planned driving maneuver, whereby a vehicle seat occupant is alerted to the future planned driving maneuver.

17. The computer program product of claim 16, wherein the haptic indication includes a movement of the vehicle seat.

18. The computer program product of claim 17, wherein the movement of the vehicle seat corresponds to a sensation that a vehicle seat occupant will experience during at least a portion of the future planned driving maneuver.

19. The computer program product of claim 18, wherein, when the future planned driving maneuver is acceleration, the movement of the vehicle seat that corresponds to a sensation that a vehicle seat occupant will experience during at least a portion of the future planned driving maneuver includes tilting the vehicle seat in a rearward direction.

20. The computer program product of claim 18, wherein, when the future planned driving maneuver is a turn or a curve, the movement of the vehicle seat that corresponds to a sensation that a vehicle seat occupant will experience during at least a portion of the future planned driving maneuver includes tilting the vehicle seat in a lateral direction opposite to the direction of the turn or the curve.

* * * * *

UNITED STATES PATENT AND TRADEMARK OFFICE
CERTIFICATE OF CORRECTION

PATENT NO. : 9,573,522 B2
APPLICATION NO. : 14/699670
DATED : February 21, 2017
INVENTOR(S) : Michael R. James Page 1 of 1

It is certified that error appears in the above-identified patent and that said Letters Patent is hereby corrected as shown below:

In the Claims

In Claim 10, Column 20, Line 27, delete "wherein".

Signed and Sealed this
Seventeenth Day of April, 2018

Andrei Iancu
*Director of the United States Patent and Trademark Office*